United States Patent
Allan et al.

(10) Patent No.: US 12,413,973 B2
(45) Date of Patent: Sep. 9, 2025

(54) MULTISESSION PAP/CHAP SUPPORT FOR WWC

(71) Applicant: Telefonaktiebolaget LM Ericsson (publ), Stockholm (SE)

(72) Inventors: David Ian Allan, Victoria (CA); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 18/558,186

(22) PCT Filed: Feb. 19, 2022

(86) PCT No.: PCT/IB2022/051487
§ 371 (c)(1),
(2) Date: Oct. 30, 2023

(87) PCT Pub. No.: WO2022/229716
PCT Pub. Date: Nov. 3, 2022

(65) Prior Publication Data
US 2024/0236670 A1    Jul. 11, 2024

Related U.S. Application Data

(60) Provisional application No. 63/182,716, filed on Apr. 30, 2021.

(51) Int. Cl.
*H04W 12/06* (2021.01)
(52) U.S. Cl.
CPC .................... *H04W 12/06* (2013.01)
(58) Field of Classification Search
CPC ..................................... H04W 12/06
See application file for complete search history.

(56) References Cited

U.S. PATENT DOCUMENTS 12,010,520 B2 * 6/2024 Tang ................. H04W 12/104
2022/0116901 A1 * 4/2022 Nilsson .............. H04W 8/26

FOREIGN PATENT DOCUMENTS

WO    2020055309 A1    3/2020

OTHER PUBLICATIONS

International Search Report and Written Opinion, Application No. PCT/IB2022/051487, May 30, 2022, 12 pages.

(Continued)

*Primary Examiner* — Jung W Kim
(74) *Attorney, Agent, or Firm* — Nicholson De Vos Webster & Elliott LLP

(57) ABSTRACT

A method of providing multiple sets of legacy credentials to be applied to one subscription in a 5th generation (5G) system, where a subscriber initiates via legacy wireline access to the 5G system, multiple communications sessions each requiring respective different credential. The method comprises receiving, at a gateway function of the 5G system, subscriber legacy wireline access via a gateway node of the subscriber, registering the subscriber and identifying the subscriber subscription based on line identification (ID). In response to registering the subscriber, receiving subscription information from a subscription data structure of the 5G system; and initiating the multiple communications sessions between the subscriber and the 5G system by having the gateway function authenticate each of the communications sessions based on the line ID, relate the line ID to additional subscriber credentials stored in the subscription data structure, and apply additional subscriber credentials for authorization of respective individual communications sessions.

20 Claims, 8 Drawing Sheets

(56) References Cited

OTHER PUBLICATIONS

3GPP TR 33.807 V0.3.0, "3rd Generation Partnership Project; Technical Specification Group Services and System Aspects; Study on the security of the Wireless and Wireline Convergence for the 5G system architecture (Release 16)," Jan. 2019, 25 pages, 3GPP Organizational Partners.
RG-LWAC Specification extracted from WT-470, Mar. 30, 2020, 7 pages, C1-203010, Broadband Forum.
B. Lloyd et al., "PPP Authentication Protocols," Oct. 1992, 16 pages, Network Working Group, Request for Comments: 1334.
W. Simpson, "Ppp Challenge Handshake Authentication Protocol (CHAP)," Aug. 1996, 14 pages, Network Working Group, Request for Comments: 1994.
A. Dekok, "The Network Access Identifier," May 2015, 30 pages, Internet Engineering Task Force (IETF), Request for Comments: 7542.
Ericsson et al., "Updates on solution #28—Line Id Transfer to and usage within 5GC," Nov. 26-30, 2018, 6 pages, SA WG2 Meeting #S2-129BIS, S2-1812501, West Palm Beach, USA.
"5G Wireless Wireline Convergence Architecture," Aug. 2020, 77 pages, TR-470, Issue 1, Broadband Forum.
"AGF Functional Requirements," Aug. 2020, 108 pages, TR-456, Issue 1, The Broadband Forum.
3GPP TS 23.316 V16.6.0, "3rd Generation Partnership Project; Technical Specification Group Services and System Aspects; Wireless and wireline convergence access support for the 5G System (5GS) (Release 16)," Dec. 2020, 83 pages, 3GPP Organizational Partners.
3GPP TS 33.501 V17.1.0, "3rd Generation Partnership Project; Technical Specification Group Services and System Aspects; Security architecture and procedures for 5G system (Release 17)," Mar. 2021, 256 pages, 3GPP Organizational Partners.
W. Simpson, "The Point-to-Point Protocol (PPP)," Jul. 1994, 54 pages, Network Working Group, Request for Comments: 1661.

\* cited by examiner

MULTISESSION PAP/CHAP SUPPORT FOR WWC

CROSS-REFERENCE TO RELATED APPLICATIONS

This application is a National stage of International Application No. PCT/IB2022/051487, filed Feb. 19, 2022, which claims the benefit of U.S. Provisional Application No. 63/182,716, filed Apr. 30, 2021, which are all hereby incorporated by reference.

TECHNICAL FIELD

Embodiments of the invention relate to the field of wireline communications; and more specifically, to the authentication of subscriber legacy credentials applied to wireline communications sessions from the subscriber accessing a 5G system.

BACKGROUND ART

The 3rd Generation Partnership Project (3GPP) unites a number of telecommunications standard developments, of which the $5^{th}$ Generation (5G) communications technology is the newest. 5G systems employ a new 5G core (5GC) and new radio access technology referred to as New Radio (NR). One of the intent with the deployment of 5G systems is to accommodate legacy technology and devices, such as 4G or Long Term Evolution (LTE), into the 5G system. However, although legacy accommodation is desirable, many operators do not want to clutter the 5G system with legacy technology, which will most likely disappear from use with widespread 5G deployment.

One area of converging older technology with 5G technology is Wireless Wireline Convergence (WWC). 5GNR is capable of complementing or replacing existing wireline (e.g., copper, cable, optical, etc.) with WWC. Operators looking to migrate wireline services to 5GC require a solution to deal with existing Customer Premises Equipment (CPE) that use legacy credentials such as Password Authentication Protocol (PAP) and Challenge Handshake Authentication Protocol (CHAP). Moreover, it is desirable to support services models that include more than one wireline Internet Protocol (IP) session, which means multiple credentials may be associated with a single 5GC subscription. In addition, the 5GC Network Functions (such as, subscription management systems utilizing Unified Data Management (UDM)/Unified Data Repository (UDR)) should be fully utilized as designed, instead of maintaining legacy wireline specific network servers in addition to 5GC. The use of multiple sessions from a Fixed Network-Residential Gateway (FN-RG) may be simultaneous to access specific service infrastructure, such as voice, internet, streaming video, etc., or sequential to access such services, where an example would be a session at device initialization to contact a configuration server from which additional configuration and credentials are obtained and used for subsequent session set up for service access, once connection to the configuration server has been dropped.

There are a number of challenges with supporting these legacy protocols with the 5G system. First is that a 5G subscription is nominally only associated with one set of credentials as it is a common channel signaling model, whereby one authenticated control channel is used for the lifecycle maintenance of all Protocol Data Unit (PDU) sessions. In the wireline world different credentials may be associated with each IP session instance that a subscriber may initiate.

A second issue is that these legacy wireline authentication methods are considered "broken" from a "strength" of security point of view by 3GPP and are only being carried forward to support the migration of existing deployments to 5G. However, there is no desire in the 3GPP community to retroactively support inadequate security mechanisms at all associated with the primary authentication mechanism. Preference is to deploy more secure techniques within the 5G system.

Furthermore, PAP/CHAP may be imported by the 5G system as a secondary authentication mechanism in addition to the primary 5G authentication, but this requires the continuance of the deployment of legacy infrastructure, such as a Remote Authentication Dial-In User Service (RADIUS) or Diameter, on top of the 5G infrastructure. However, operators moving to 5G have a strong desire to decommission legacy Authentication, Authorization and Accounting (AAA) servers such as RADIUS.

The issue becomes, how to support legacy AAA techniques (e.g., PAP/CHAP) in the 5G system without employing a legacy infrastructure on top of the 5G system, which infrastructure would be needed to provide a separate mechanism for secondary authentication of communications sessions, such as those requiring PAP and/or CHAP.

SUMMARY

Certain aspects of the present disclosure and their embodiments provide solutions to challenges noted above. In one aspect of the disclosed system, a method provides for multiple sets of legacy credentials to be applied to one subscription in a $5^{th}$ generation (5G) system, where a subscriber initiates via legacy wireline access to the 5G system, multiple communications sessions each requiring respective different credentials. The method provides for receiving, at a gateway function of the 5G system, subscriber legacy wireline access via a gateway node of the subscriber and registering the subscriber with the 5G system and identifying the subscriber subscription based on line identification (ID). The method further provides for, in response to registering the subscriber with the 5G system, receiving subscription information from a subscription data structure of the 5G system and initiating the multiple communications sessions between the subscriber and the 5G system, by having the gateway function authenticate each of the communications sessions based on the line ID, relate the line ID to additional subscriber credentials stored in the subscription data structure, and apply the additional subscriber credentials for authorization of respective individual communications sessions.

In another aspect of the disclosed system, the subscription data structure is a Residential Gateway-Level Wireline Access Characteristics (RG-LWAC).

In another aspect of the disclosed system, the gateway function of the 5G system is an Access Gateway Function (AGF) of the 5G system.

In another aspect of the disclosed system, the communications sessions are authenticated with Password Authentication Protocol (PAP), Challenge Handshake Authentication Protocol (CHAP), or employ a mix of both PAP and CHAP.

In another aspect of the disclosed system, the gateway node of the subscriber is a Fixed Network-Residential Gateway.

In another aspect of the disclosed system, the additional subscriber credentials are stored in the RG-LWAC as one or more Additional Authentication Credential Instance (AACI) Type-Length-Values (TLVs).

In another aspect of the disclosed system, a communications session authenticated with CHAP involves the AGF issuing a CHAP challenge to the gateway node of the subscriber; in response to the gateway node responding to the CHAP challenge with a challenge response that includes a user ID and a Network Access Identifier (NAI), attempting to match the NAI and the user ID in the AACI TLVs for authentication to process the CHAP challenge; and in response to the gateway node responding to the CHAP challenge with no NAI present and one or more AACI TLVs with a NULL NAI, attempting to match the user ID to process the CHAP challenge.

In another aspect of the disclosed system, a communications session authenticated with PAP involves the AGF attempting to match a user ID, Network Access Identifier (NAI) and a password against the AACI TLVs for authentication.

In another aspect of the disclosed system, subscriber credentials are imported into the subscription data structure of the 5G system as additional subscriber credentials.

In another aspect of the disclosed system, a node in the 5G system operates as a gateway function to provide multiple sets of legacy credentials to be applied to one subscription in the 5G system, where a subscriber initiates via legacy wireline access to the 5G system, multiple communications sessions each requiring respective different credential. The node utilizes at least one processor and a memory having instructions which, when executed by the at least one processor, cause the gateway function to:
  receive, at the gateway function of the 5G system, subscriber legacy wireline access via a gateway node of the subscriber;
  register the subscriber with the 5G system and identify subscriber subscription based on line identification (ID);
  in response to registration of the subscriber with the 5G system, receive subscription information from a subscription data structure of the 5G system; and
  initiate the multiple communications sessions between the subscriber and the 5G system by having the gateway function authenticate each of the communications sessions based on the line ID, relate the line ID to additional subscriber credentials stored in the subscription data structure, and apply additional subscriber credentials for authorization of respective individual communications sessions.

In another aspect of the disclosed system, a computer program containing instructions which, when executed on at least one processor, cause the at least one processor to carry out a method that provides for multiple sets of legacy credentials to be applied to one subscription in a $5^{th}$ generation (5G) system, where a subscriber initiates via legacy wireline access to the 5G system, multiple communications sessions each requiring respective different credential. The computer program further provides for receiving, at a gateway function of the 5G system, subscriber legacy wireline access via a gateway node of the subscriber and registering the subscriber with the 5G system and identifying the subscriber subscription based on line identification (ID). The computer program further provides for, in response to registering the subscriber with the 5G system, receiving subscription information from a subscription data structure of the 5G system and initiating the multiple communications sessions between the subscriber and the 5G system, by having the gateway function authenticate each of the communications sessions based on the line ID, relate the line ID to additional subscriber credentials stored in the subscription data structure, and apply the additional subscriber credentials for authorization of respective individual communications sessions.

In another aspect of the disclosed system, a computer-readable storage medium has stored thereon a computer program which provides for carrying out a method that provides for multiple sets of legacy credentials to be applied to one subscription in a $5^{th}$ generation (5G) system, where a subscriber initiates via legacy wireline access to the 5G system, multiple communications sessions each requiring respective different credential. The computer program further provides for receiving, at a gateway function of the 5G system, subscriber legacy wireline access via a gateway node of the subscriber and registering the subscriber with the 5G system and identifying the subscriber subscription based on line identification (ID). The computer program further provides for, in response to registering the subscriber with the 5G system, receiving subscription information from a subscription data structure of the 5G system and initiating the multiple communications sessions between the subscriber and the 5G system, by having the gateway function authenticate each of the communications sessions based on the line ID, relate the line ID to additional subscriber credentials stored in the subscription data structure, and apply the additional subscriber credentials for authorization of respective individual communications sessions.

There are, proposed herein, various embodiments which address one or more of the issues disclosed herein. Certain embodiments may provide one or more of the following technical advantage(s).

It allows operators that need to maintain a legacy Authentication, Authorization and Accounting (AAA) exchange with deployed customers to carry that paradigm forward during 5G transition while moving towards the removal of legacy AAA.

A core essence of the solution is that associated with a 5G subscription, there is wireline specific information that can be augmented to support a number of migration scenarios.

PAP/CHAP authentication is handled by an existing RG-LWAC by providing an extension via TLVs.

It allows multiple sets of legacy credentials to be applied to a single subscription bound to attempts to access specific Data Network Names (DNNs).

Supports both sequential session establishment use case as well as multiple sessions in parallel.

This is achieved with no changes needed from 3GPP to transition to the 5G system, as all artifacts of ongoing legacy support are confined to the AGF and a wireline specific data structure.

BRIEF DESCRIPTION OF THE DRAWINGS

The embodiments of the disclosure may best be understood by referring to the following description and accompanying drawings. In the drawings.

DETAILED DESCRIPTION

The following description describes methods and apparatus for multisession PAP/CHAP support for WWC. The following description describes numerous specific details such as operative steps, resource implementations, data structures, types of network functions, types of AAA protocols, and interrelationships of system components to provide a more thorough understanding of the present disclosure. It will be appreciated, however, by one skilled in the art that the embodiments of the present disclosure can be practiced without such specific details. In other instances, control structures, circuits, memory structures, system and/or network functions, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to implement such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in some embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some of the embodiments contemplated herein apply to specific functions, data structures, gateways, etc., associated with 5G wireless communication technologies. Some embodiments can employ different functions, structures, gateways, etc. The disclosure describes PAP/CHAP as examples of legacy authentication credentials. However, some embodiments may apply to other authentication protocols.

Figure 1:
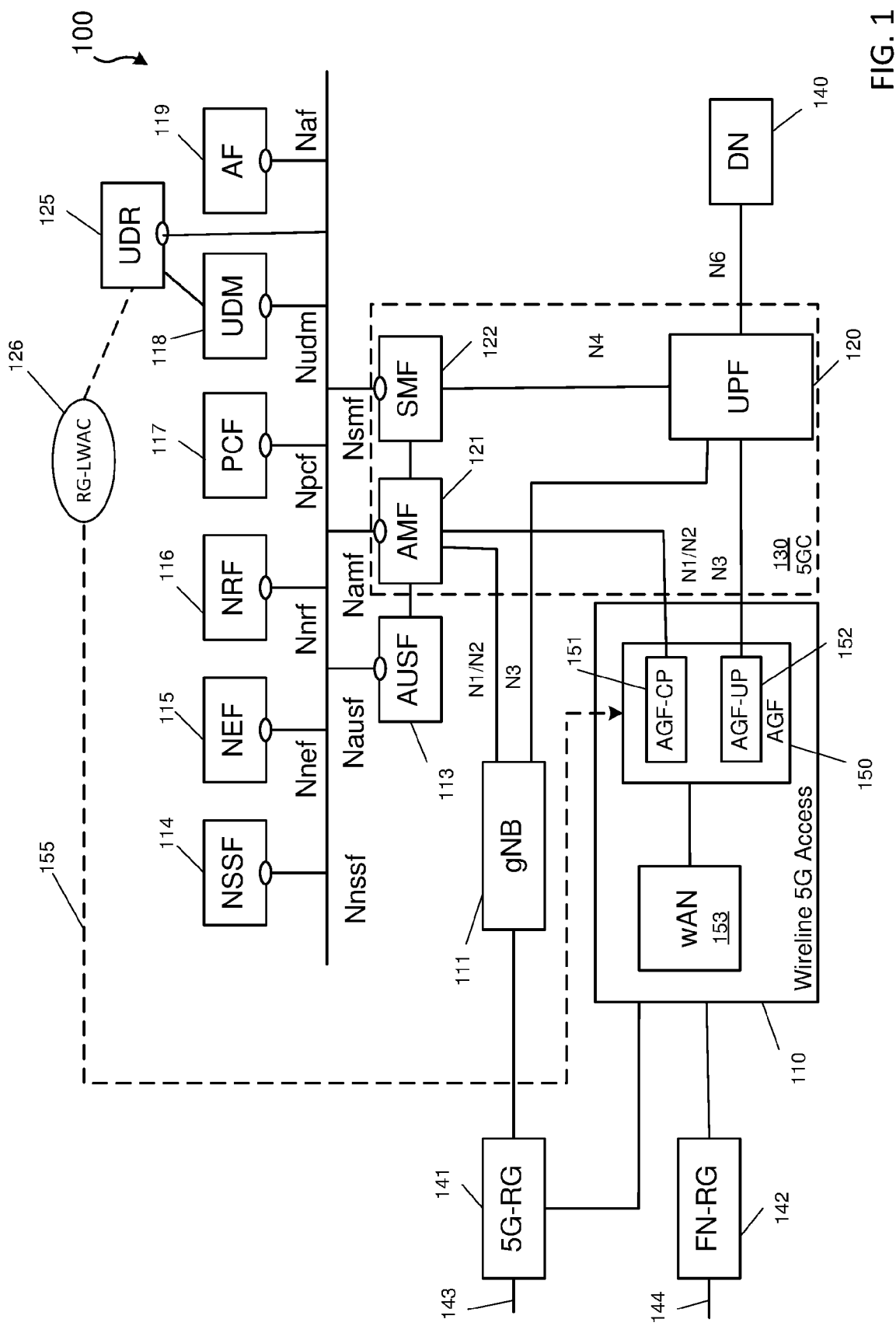
FIG. 1 shows a 5G system in accordance with some embodiments of the present disclosure.

FIG. 1 shows a 5G system in accordance with some embodiments of the present disclosure. FIG. 1 shows a 5G system 100 as depicted in 3GPP Technical Specification (TS) 23.501 with a 5G Core (5GC) 130 and associated network functions 113-119. FIG. 1 also shows a wireless connection to the 5G system 100 via a Radio Access Network (RAN) 111. The RAN for the 5G system 100 can be the afore-mentioned New Radio (NR). The 5G RAN 111 connection is shown as a gNodeB (gNB) 111. A wireline connection to the 5G system 100 is via a Wireline 5G Access Network (AN) 110. The 5G system 100 also connects to a Data Network (DN) 140, such as the Internet. The gNB 111 and the wireline access network 110 connect to the data network 140 via a User Plane Function (UPF) 120 using interfaces N3 and N6. The UPF 120 is a service function that processes user plane packets, which processing may include altering the packet's payload and/or header, providing interconnections, routing the packet, etc.

The base components of the 5GC are the UPF 120, an Access and Mobility Function (AMF) 121 and a Session Management Function (SMF) 122. Working with the 5GC components are various other network functions of the 5G system 100. The shown functional units are an Authentication Server Function (AUSF) 113 for storing data for authentication of a user device, a Network Slice Selection Function (NSSF) 114 for handling network slicing, a Network Exposure Function (NEF) 115 for exposing capabilities and events, a Network Repository Function (NRF) 116 for providing discovery and registration functionality for Network Functions (NFs), a Policy Control Function (PCF) 117, Unified Data Management (UDM) 118 for storing subscriber data and profiles, and an Application Function (AF) 119 for supporting specific applications and application influence on traffic routing. The 5G system 100 also includes a Unified Data Repository (UDR) 125, that connects to and operates with the UDM 118.

The base components of the 5GC 130 are the core network control plane functions configured to provide mobility management in the form of an Access and Mobility Function (AMF) 121 for providing User Equipment (UE) based authentication, authorization, mobility management, etc.; a core network control plane function configured to provide session management in the form of a Session Management Function (SMF) 122 configured to perform session management, e.g. session establishment, modify and release; and the UPF. The configuration of various components/functions shown in FIG. 1 are examples only and other embodiments may have other configurations, including different set of components/functions.

The wireline access network 110 includes an Access Gateway Function (AGF) 150, which separates Control Plane (CP) traffic from User Plane (UP) traffic. The AGF 150 shows the separation of the UP traffic and CP traffic as AGF-CP 151 and AGF-UP 152. The AGF-CP 151 connects to the AMF 121 via interface N1/N2 and the AGF-UP 152 connects to the UPF 120 via interface N3. The wireline access network can include a wireless Access Network wAN 153.

FIG. 1 illustrates the WWC of having both wireless and wireline connections to the 5G system 100. A user device (not shown) can connect via a 5G-Residential Gateway (5G-RG) 141 or a Fixed Network-Residential Gateway (FN-RG) 142. The 5G-RG 141 provides the connection between the networked equipment within a home or small office to the 5GC 130 and to the DN 140. The 5G-RG 141 can support both a wireless interface and a wireline interface towards the 5GC 130. The FN-RG 142 is a legacy wireline device connection supported by the WWC extension to the 5G system.

A variety of devices and/or user connections can be connected to 5G-RG 141 or FN-RG 142 via input connection 143 and 144, respectively. Such devices can be a variety of terminal devices, commonly referred to as User Equipment (UE). The devices can include, but are not limited to, computers, laptops, set-top boxes, televisions, mobile devices, wireless devices, machine type device, Internet of Things (IoT) devices, etc. These terminal devices provide services in the areas of data transfer, including Enhanced Mobile Broadband (eMBB), Machine Type Communications (MTC), Massive MTC (MMTC) and Ultra Reliable Low Latency Communications (URLLC), IoT, Massive IoT, and Critical IoT, as well as voice and streaming data.

In deploying the WWC with the 5G system 100, a subscriber having the capability to access the 5G-RG 141 can initiate a single subscriber authentication connection. However, for those subscribers utilizing a legacy (e.g., non-5G capable) access, the connection is via the FN-RG 142. The current primary mechanism of authenticating a legacy residential gateway (e.g., FN-RG) is via the use of a network generated Subscription Permanent Identifier (SUPI) based on network provisioned information, known as a Global Line ID (GLI). The use of such a SUPI is considered to be "pre-authenticated" by the 3GPP network and allows registration of a legacy device to proceed.

As noted above in the Background section, a 5G subscription is nominally only associated with one set of credentials as it is a common channel signaling model, whereby one authenticated control channel is used for the lifecycle maintenance of all Protocol Data Unit (PDU) sessions. In the legacy wireline world, such as via the FN-RG 142, different credentials may be associated with each IP session instance that a subscriber may initiate.

Thus, Point-to-Point Protocol over Ethernet (PPPoE) operators may require the ongoing support of PAP/CHAP credentials to facilitate the transformation of their networks to the 5G system. An objective is to decommission existing RADIUS infrastructure as part of the transformation process, so that such legacy practices are not integrated into the 5G system.

To achieve this WWC, the disclosure introduces the concept of "additional authentication." The term "additional authentication" is to refer to a different authentication technique for the 5G system in order to specifically distinguish this technique from the 3GPP concepts of "primary" and "secondary" authentication. Primary being the authentication of the subscriber to the 5G System, and secondary being the authentication of the subscriber to the operator of a specific Data Network Name (DNN).

Additional authentication, as described herein, allows the 5G system operator to perform additional PAP/CHAP authentication of FN-RG subscriber IP session initiation when the subscriber has already had primary authentication performed via GLI based SUPI. This may be combined with Network Access Identifier (NAI) based session steering to allow per session credentials. NAI is a combination of user-id and realm as defined in the Internet Engineering Task Force (IETF) Request For Comments (RFC) 7542. A realm is a logical method of identifying a domain, a network, a collection of networks, or a set of addresses.

The capability of providing the additional authentication is achieved by the porting (e.g., import) of PAP/CHAP credential information from RADIUS (or other legacy locations) into a Residential Gateway-Level Wireline Access Characteristics (RG-LWAC) data structure 126. In some embodiments, the porting of PAP/CHAP credential is accomplished as one or more Additional Authentication Credential Instance (AACI) Type-Length-Value (TLV) encoded information elements.

The RG-LWAC 126 is an existing data structure associated with the subscription. RG-LWAC 126 is a data structure opaque to the 5G system that is stored in the UDM 118/UDR 125. The RG-LWAC normally contains information about the wireline traffic contract for the access circuit between the 5G System and the FN or 5G-RG. Thus, wireline access technology specific Quality of Service (QoS) information corresponding to a specific wireline access subscription is contained in the RG-LWAC 126.

A solution in some embodiments is to augment the information in RG-LWAC with legacy credential information indexed by NAI realm. The RFC 7542 document defines the syntax for the NAI, the user identifier submitted by the client prior to accessing resources. NAI is the mechanism used with PAP/CHAP for network selection in legacy networks. So, by having a unique set of credentials per NAI, the NAI permits the PAP/CHAP paradigm to be carried forward to facilitate network migration without compromising the 5G system or requiring the continued maintenance of legacy AAA infrastructure. The technique disclosed herein permits the AGF 150 to evaluate the results of CHAP challenges and/or validate PAP passwords directly by use of additional authentication information retained in the RG-LWAC 126. This connection is shown by dotted line 155 in FIG. 1.

It should be noted that this technique can involve the communication of shared secrets unencrypted within the 5G system 100 for some embodiments, but the validity of such credentials is scoped to that of the subscription authenticated by the primary authentication mechanisms (GLI based SUPI). Operators then may weigh the merits of decommissioning existing RADIUS infrastructure accordingly.

Figure 2:
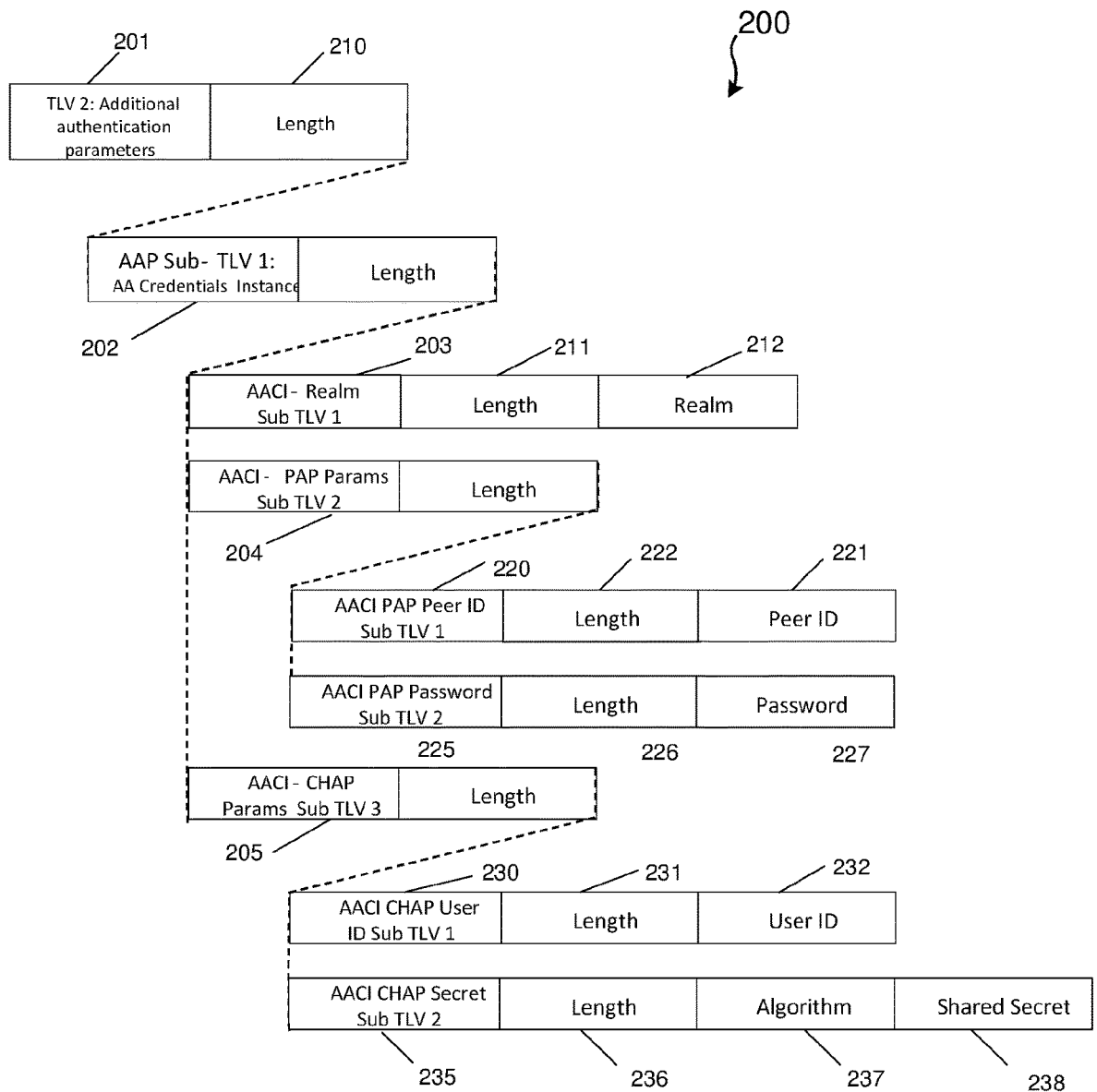
FIG. 2 shows one format for the Additional Authentication Credential Instance TLVs in accordance with some embodiments of the present disclosure.

FIG. 2 shows one format for the Additional Authentication Credential Instance (AACI) TLVs 200 in accordance with some embodiments of the present disclosure. An additional authentication parameters TLV 201 has one or more Additional Authentication Credential Instance (AACI) TLVs 202. Each AACI TLV 202 can have an optional AACI-Realm sub-TLV 203 and one of an AACI-PAP TLV (sub-TLV 2) 204 or an AACI-CHAP TLV (sub-TLV 3) 205.

An AACI TLV length field 210 encodes the cumulative length of all sub-TLVs in octets. The additional authentication parameters TLV 201 contains one AACI sub-TLV 204, 205 that does not encode a realm. The AACI TLV 202 is to be unique from the point of view of the realm information, such that the presence or absence of an NAI realm will only resolve to a single AACI TLV.

The AACI-PAP TLV 204 has an AACI-PAP Peer ID sub-TLV 220 and an AACI-PAP Password sub-TLV 225. The AACI-CHAP TLV 205 has an AACI-CHAP User ID sub-TLV 230 and an AACI-CHAP Secret sub-TLV 235.

In some embodiments, the encodings of the sub-TLVs are as follows:

AACI-Realm TLV (Sub-TLV 1) 203—Length 211 is 16-bit unsigned value encoding the length of a Realm field 212 in octets. Realm is a variable length array which corresponds to the NAI realm as specified in RFC 7542.

AACI-PAP Peer TLV (sub-TLV 1) 220—Length 222 is 16-bit unsigned value encoding the length of the Peer-ID 221 in octets. The Peer ID 221 is a variable length array which corresponds to the peer-ID in a PAP message as per RFC 1334 exclusive of NAI realm information as per RFC 7542.

AACI-PAP Password (sub-TLV 2) 225—Length 226 is 16-bit unsigned value encoding the length of the password in octets. Password 227 is a variable length array that encodes the password as per RFC 1334.

AACI CHAP User ID (sub-TLV 1) 230—Length 231 is 16-bit unsigned value encoding a CHAP user ID 232. The CHAP User ID 232 is a variable length array that corresponds to the name field in a CHAP response message as per RFC 1994 exclusive of NAI realm information as per RFC 7542.

AACI CHAP Secret (sub-TLV 2) 235—Length 236 is the value in octets of the algorithm and secret fields (currently specified as 17 octets). Algorithm field 237 is a fixed length field of one octet in length and is set to 5 (CHAP with MD5) as per RFC 1994. A Shared Secret 238 is a variable length array that encodes the secret as per the Algorithm field 237. In this case, it is a 16 byte MD5 hash used for CHAP validation of challenges.

It is to be noted that the AACI TLVs 200 illustrated in FIG. 2 is applicable to some embodiments. Some embodiments may utilize different TLV implementation to implement the PAP/CHAP support for WWC as disclosed herein.

Regarding FIG. 1, the subscription data structure that contains the AACI TLVs 200 described above is the RG-LWAC 126 in some embodiments. As shown, the RG-LWAC 126 is part of UDR 125 that operates with UDM 118. The wireline access that initiates multiple communications sessions is via a gateway node, such as the FN-RG 142 in some embodiments. The FN-RG 142 communicates with the 5G system 100 via the AGF 150 and registers a subscriber with the 5G system 100 and identifies the subscriber subscription based on line identification (line ID). The subscriber subscription identification can utilize the primary authentication procedure of the 5G system, in which the line ID is associated with the one subscriber ID for the 5G system 100.

In response to registering the subscriber with the 5G system 100, the additional authentication information (e.g., AACI TLVs) contained in the data structure (e.g., RG-LWAC) for that subscriber is sent from the UDM/UDR 118/125 to the AGF 150. Once the AGF 150 acquires the additional authentication information from the 5G system 100, the AGF has the necessary information to authenticate credentials without further credential interactions by the 5G system 100. Thus, when the gateway function (e.g., AGF 150) receives multiple communications sessions, whether simultaneously or sequentially, employing legacy credential authentication (e.g., PAP and/or CHAP), the gateway function can handle the multiple communications sessions without needing the 5G system 100 to contact and retrieve credential information, such as from a RADIUS server.

Figure 3:
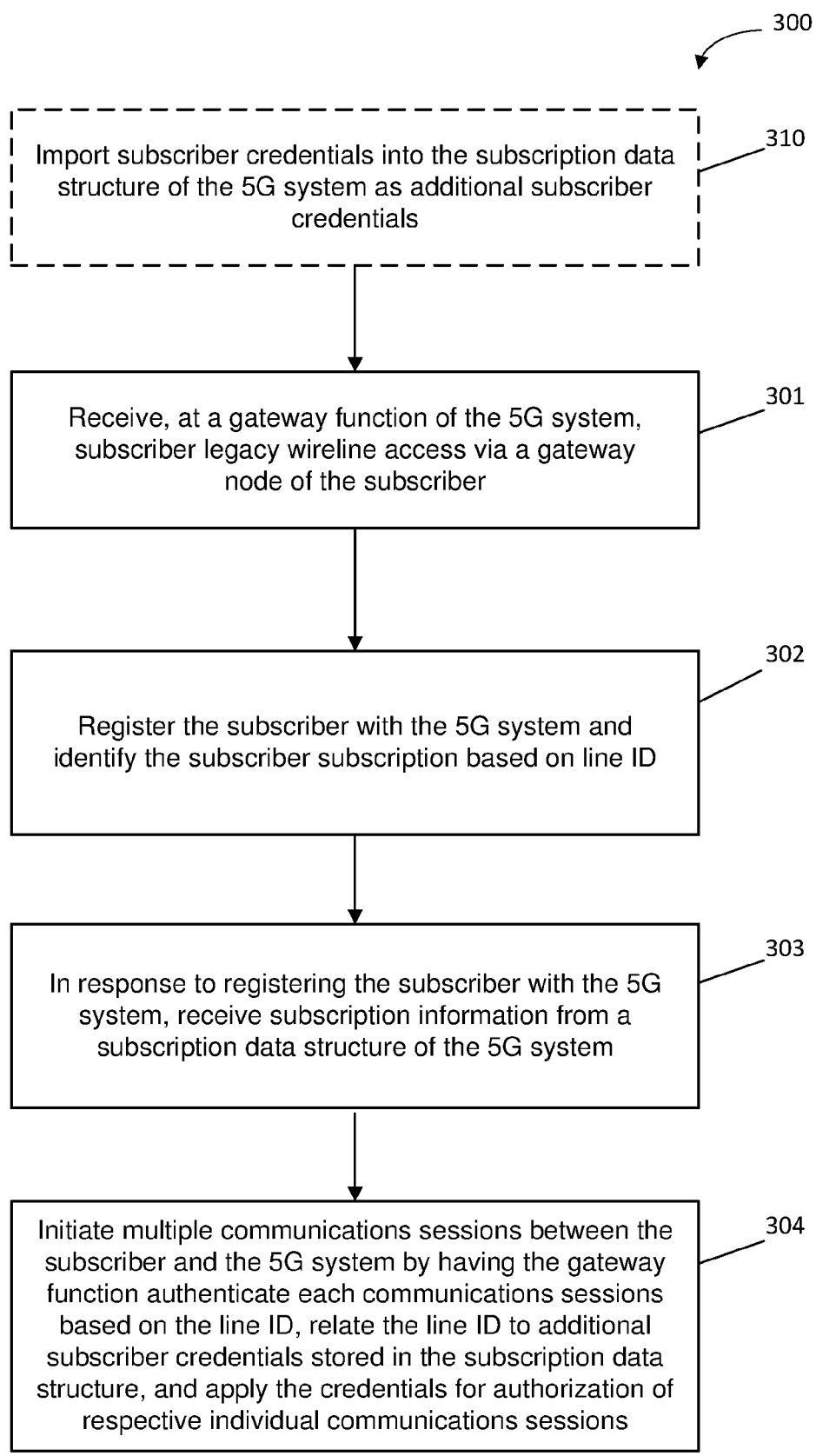
FIG. 3 shows a method for performing multiple communications sessions employing a gateway function for credential authentication in accordance with some embodiments of the present disclosure.

FIG. 3 shows a method for performing multiple communications sessions employing a gateway function for credential authentication in accordance with some embodiments of the present disclosure. A method 300 provides for multiple sets of legacy credentials to be applied to one subscription in the 5G system, where a subscriber initiates via legacy wireline access to the 5G system, multiple communications sessions each requiring respective different credential.

At operation 301, a gateway function (e.g., AGF 150) of the 5G system receives subscriber legacy wireline access via a gateway node of the subscriber (e.g., FN-RG 142). At operation 302, the gateway function registers the subscriber with the 5G system and identifies the subscriber subscription based on line ID. At operation 303, in response to registering the subscriber with the 5G system, the gateway function receives subscription information from a subscription data structure (e.g., RG-LWAC 126) of the 5G system. At operation 304, the gateway function initiates the multiple communications sessions between the subscriber and the 5G system by having the gateway function authenticate each of the communications sessions based on the line ID, relate the line ID to additional subscriber credentials (e.g., TLVs) stored in the subscription data structure, and apply the additional subscriber credentials for authorization of respective individual communications sessions.

In some embodiments, the additional subscriber credentials are previously obtained and/or already entered in the subscription data structure. In some embodiments, when the subscriber (such as a new subscriber) initiates operations with the 5G system, the 5G system can obtain and/or import legacy credential information. For example, when the subscriber initiates operations, the 5G system establishes the RG-LWAC 126 for wireline access technology specific QoS information corresponding to a specific wireline access subscription, as described earlier. Then, as shown in optional operation 310, the 5G system can acquire the legacy credentials and format the various legacy credentials as AACI TLVs 200. For example, the 5G system can obtain the legacy credentials from an existing RADIUS server. Once the 5G system acquires the legacy credentials, such as from RADIUS, the credential information is reformatted as TLVs and retained. Thus, subsequent access to such legacy credential systems are not needed.

Figure 4:
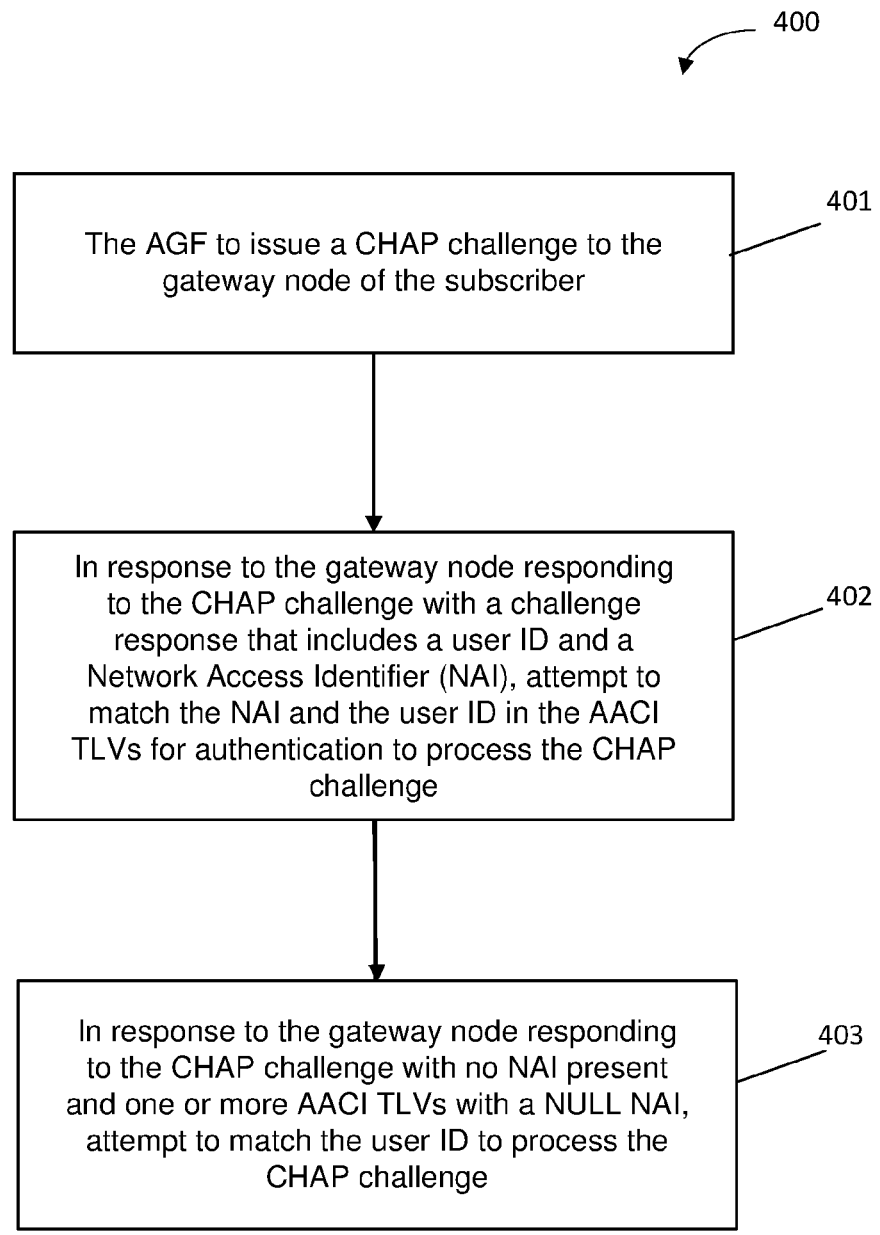
FIG. 4 shows a method performed by an AGF for processing a CHAP credential authentication in accordance with some embodiments of the present disclosure.

FIG. 4 shows a method 400 performed by an AGF for processing a CHAP credential authentication in accordance with some embodiments of the present disclosure. A gateway function, such as the AGF 150, performs the method 400 for additional authentication procedure for CHAP credential authentication. At operation 401, the AGF 150 issues a CHAP challenge to the gateway node (e.g., FN-RG) of the subscriber. In response to the gateway node responding to the CHAP challenge with a challenge response that includes a user ID and NAI, the AGF 150 attempts to match the NAI and the user ID in the Authentication Credentials TLVs for authentication to process the CHAP challenge (operation 402). If the gateway node responds with no NAI present and one or more AACI TLVs has a NULL NAI, the AGF 150 attempts to match the user ID to process the CHAP challenge (operation 403). If there is no match between the challenge response and the expected response generated from the challenge shared secret, the AGF 150 rejects the authentication. Upon successful authentication, a Protocol Data Unit (PDU) session initiation proceeds using Data Network Name/Selected-Network Slice Selection Assistance Information (DNN/S-NSSAI) determination process.

Figure 5:
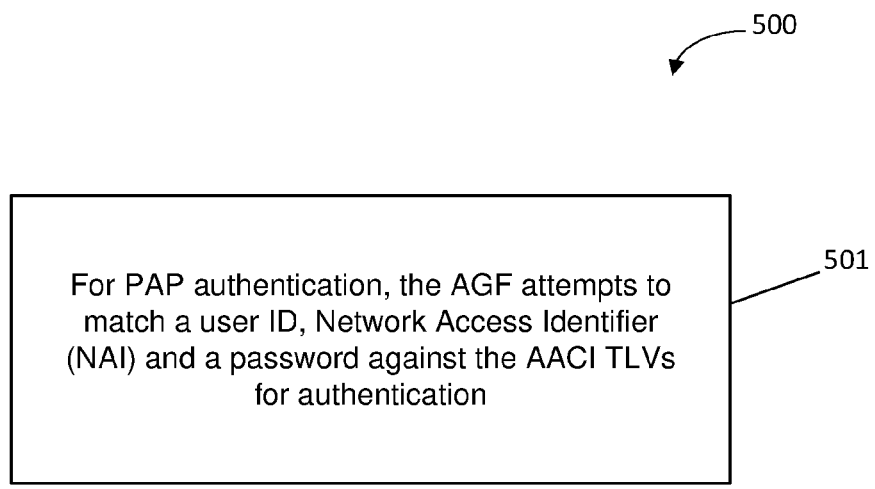
FIG. 5 shows a method performed by an AGF for processing a PAP credential authentication in accordance with some embodiments of the present disclosure.

FIG. 5 shows a method 500 performed by an AGF for processing a PAP credential authentication in accordance with some embodiments of the present disclosure. A gateway function, such as the AGF 150, performs the method 500 for additional authentication procedure for PAP credential authentication. At operation 501, the AGF 150 attempts to match a user ID, NAI and a password against the Authentication Credential TLVs for authentication. If there is a match, the authentication is valid. If there is no match or the password is invalid, the authentication is invalid. Upon successful authentication, PDU session initiation proceeds using the DNN/S-NSSAI determination process.

Figure 6:
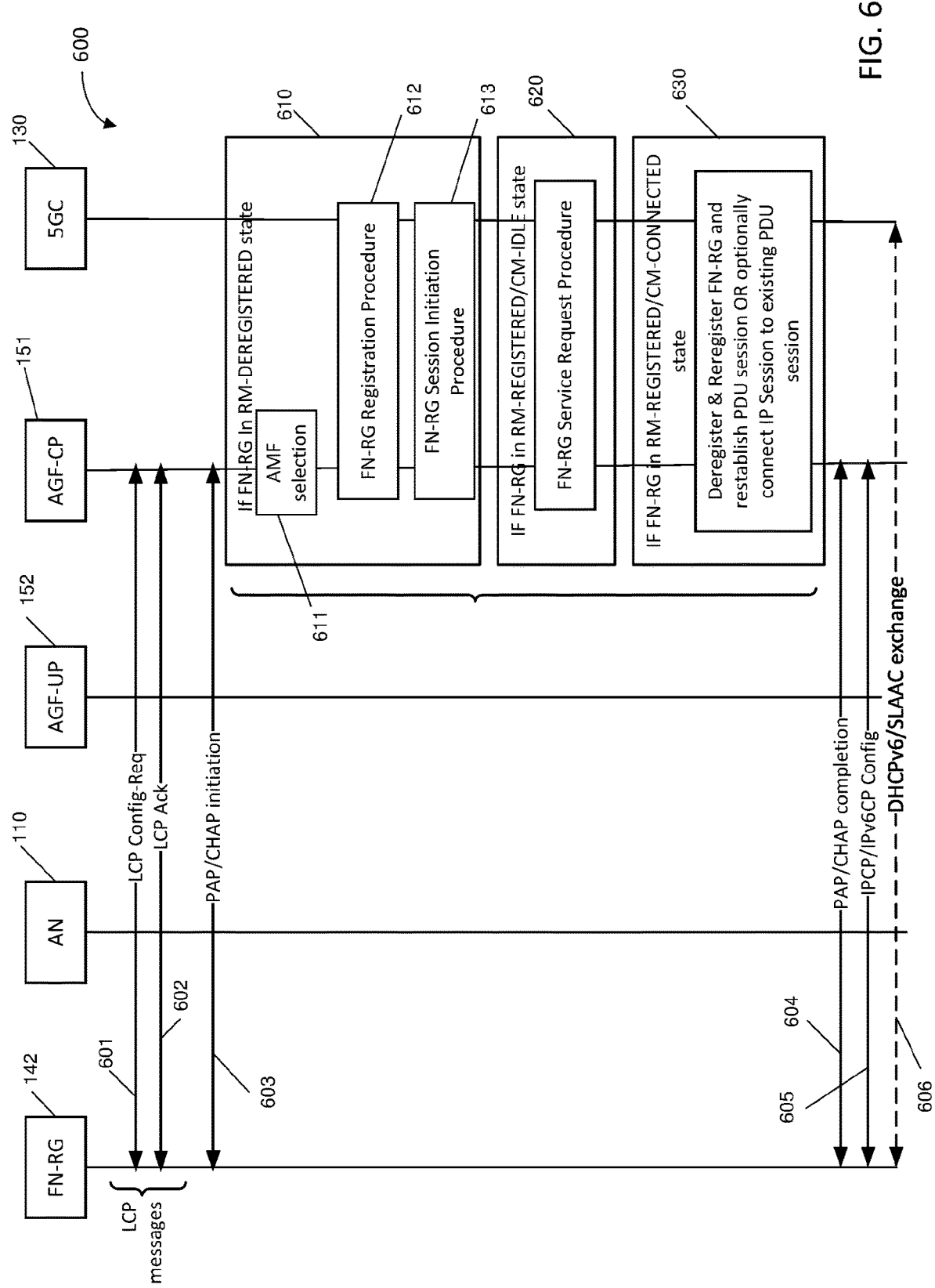
FIG. 6 shows a signalling diagram for initiating multiple communications sessions using a legacy wireline connection in accordance with some embodiments of the present disclosure.

FIG. 6 shows a signalling diagram 600 for initiating multiple communications sessions using a legacy wireline connection in accordance with some embodiments of the present disclosure. Diagram 600 shows relevant components of FIG. 1 which participate in the signalling between the FN-RG 142 and 5GC 130, via AGF-CP 151. At operations 601 and 602, Link Control Protocol (LCP) messages provide for handshake between FN-RG 142 and AGF-CP 151 using LCP configuration request (LCP Config-Req) 601 and LCP acknowledge 602. A PAP and/or CHAP initiation occurs at operation 603.

The AGF-CP 151 communicates with the 5GC 130, namely the AMF 121, and connects to UDM/UDR. If the FN-RG 142 is in a Registration Management (RM)-Deregistered state 610 with the 5GC, there is an AMF selection operation 611, followed by an FN-RG registration procedure 612 and an FN-RG session initiation procedure 613 according to the description above.

If the FN-RG is in RM-registered/Connection Management idle (CM-IDLE) state 620, the FN-RG service request procedure follows the description above. However, if the FN-RG is in RM-registered CM-Connected state 630, the 5GC can either deregister and reregister the FN-RG and reestablish the PDU session or connect the Internet Protocol (IP) session to an existing PDU session.

The PAP/CHAP initiation follows the authentication using the additional subscriber credentials contained in the TLVs of the RG-LWAC as described above in the disclosure. With the completion of valid credential authentication (operation 604), Internet Protocol [v4] Control Protocol (IPCP) and/or IPv6CP configuration is provided (operation 605). With credential authentication validated at the AGF 150 and the configuration set, a configuration connection is established for a valid session between the FN-RG 142 and 5GC, shown as operation 606, in which Dynamic Host Configuration Protocol v6/Stateless Address Autoconfiguration (DHCP/SLAAC) exchange takes place between the FN-RG 142 and the 5GC. Note that this particular signalling diagram 600 is implemented in some embodiments. Some embodiments may use different signalling diagrams.

Figure 7:
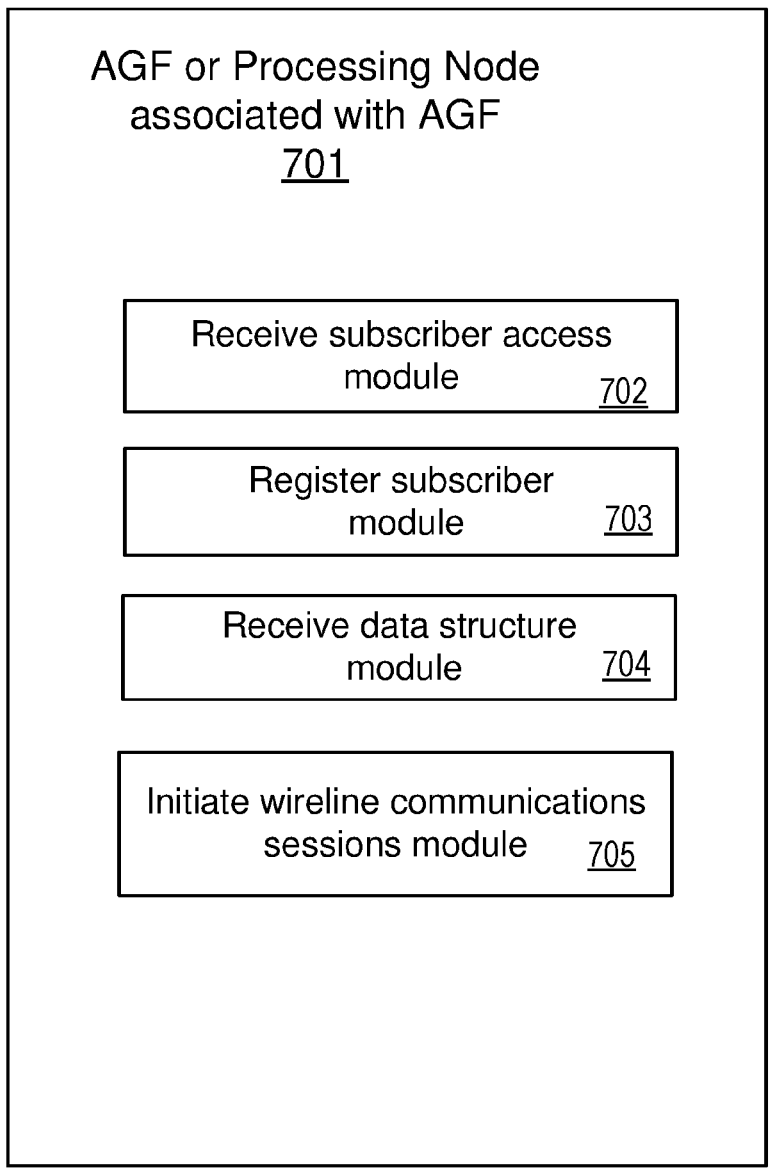
FIG. 7 shows a gateway function node, according to some embodiments of the present disclosure.

FIG. 7 shows a gateway function node 701, according to some embodiments of the present disclosure. In some embodiments, the gateway function node 701 is an AGF (such as AGF 150) or a processing node that provides the functions of the AGF. The node 701 can implement the functions of the method 300 of FIG. 3, as well as the PAP/CHAP authentication described in reference to FIGS. 4 and 5. As shown, a Receive Subscriber Access module 702 can perform operations corresponding to the operation 301 of FIG. 3. A Register Subscriber module 703 can perform operations corresponding to the operation 302. A Receive Data Structure module 704 can perform operations corresponding to the operation 303. An Initiate Wireline Communications Sessions module 705 can perform the operations corresponding to operation 304. The gateway function node 701 may contain other functional elements that are not shown.

In some embodiments, the modules 702-705 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the node 701 are implemented in software. In other embodiments, the modules of the node 701 are implemented in hardware. In further embodiments, the modules of the node 701 are implemented in a combination of hardware and software. In some embodiments, the computer program can be provided on a carrier, where the carrier is one of an electronic signal, optical signal, radio signal or computer storage medium.

Figure 8:
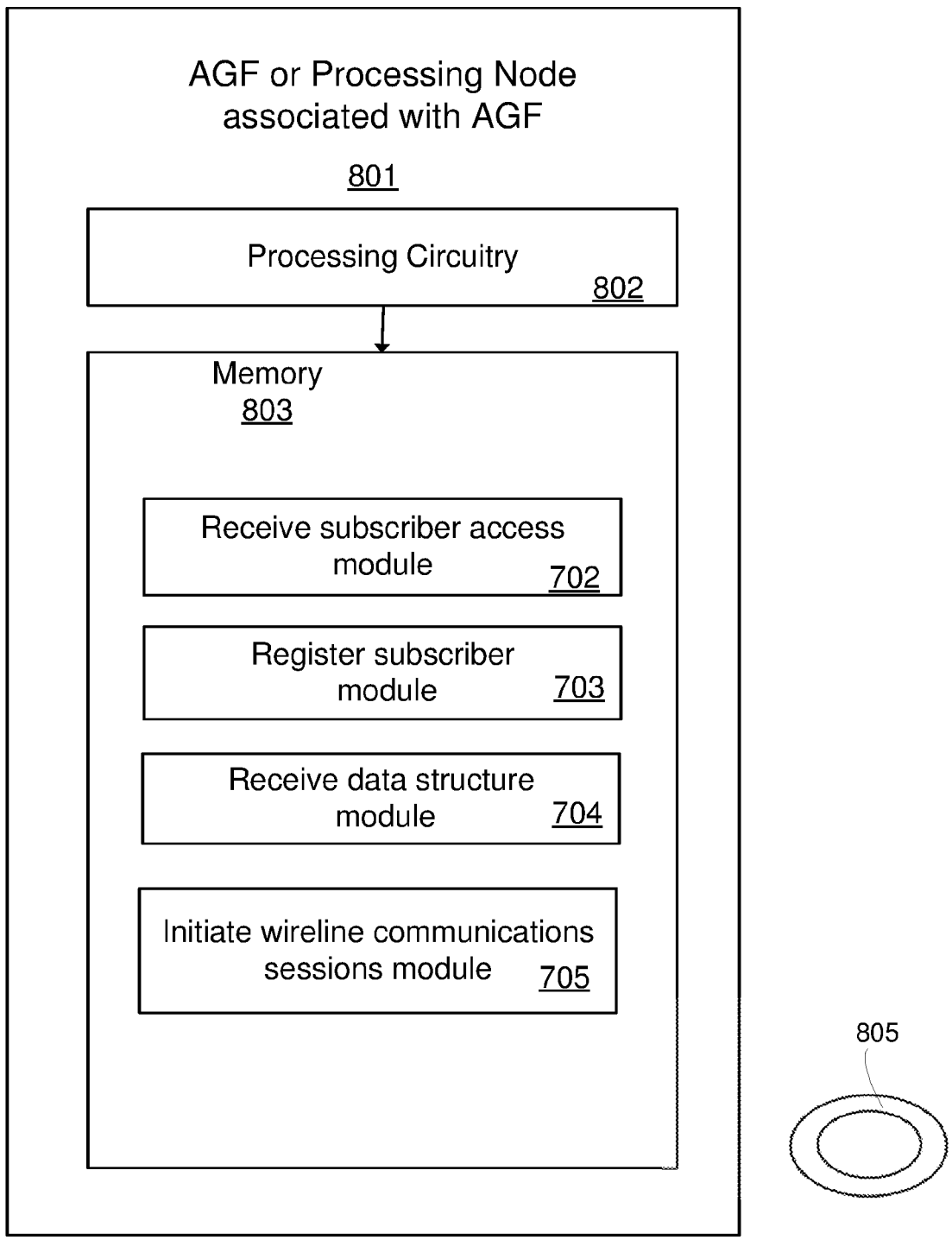
FIG. 8 shows another gateway function node, according to some embodiments of the present disclosure.

FIG. 8 shows another gateway function node 801, according to some embodiments of the present disclosure. In some embodiments, the gateway function node 801 is an AGF (such as AGF 150) or a processing node that provides the functions of the AGF. The node 801 can implement the functions of the method 300 of FIG. 3, as well as the PAP/CHAP authentication described in reference to FIGS. 4 and 5. In some embodiments, the node 801 can be configured to implement the modules 702-705 of FIG. 7, wherein the instructions of the computer program for providing the functions of modules 702-705 reside in a memory 803.

The gateway function node 801 comprises processing circuitry (such as one or more processors) 802 and a non-transitory machine-readable medium, such as the memory 803. The processing circuitry 802 provides the processing capability. The memory 803 can store instructions which, when executed by the processing circuitry 802, are capable of configuring the function node 801 to perform the methods described in the present disclosure. The memory can be a computer readable storage medium, such as, but not limited to, any type of disk 805 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method of providing multiple sets of legacy credentials to be applied to one subscription in a 5$^{th}$ generation (5G) system, where a subscriber initiates via legacy wireline access to the 5G system, multiple communications sessions each requiring respective different credential, the method comprising:
   receiving, at a gateway function of the 5G system, subscriber legacy wireline access via a gateway node of the subscriber;
   registering the subscriber with the 5G system and identifying subscriber subscription based on line identification (ID);
   in response to registering the subscriber with the 5G system, receiving subscription information from a subscription data structure of the 5G system, wherein the subscription data structure is a Residential Gateway-Level Wireline Access Characteristics (RG-LWAC); and
   initiating the multiple communications sessions between the subscriber and the 5G system by having the gateway function authenticate each of the multiple communications sessions based on the line ID, relate the line ID to additional subscriber credentials stored in the RG-LWAC as one or more Additional Authentication Credential Instance (AACI) Type-Length-Values (TLVs), and apply the additional subscriber credentials for authorization of respective individual communications sessions.

2. The method according to claim 1, wherein the gateway function of the 5G system is an Access Gateway Function (AGF) of the 5G system.

3. The method according to claim 1, wherein the multiple communications sessions are authenticated with Password Authentication Protocol (PAP), Challenge Handshake Authentication Protocol (CHAP), or employ a mix of both PAP and CHAP.

4. The method according to claim 1, wherein the gateway node of the subscriber is a Fixed Network-Residential Gateway.

5. The method according to claim 1, wherein for a communications session authenticated with Challenge Handshake Authentication Protocol (CHAP), the method further comprises:
   an Access Gateway Function (AGF) issuing a CHAP challenge to the gateway node of the subscriber;
   in response to the gateway node responding to the CHAP challenge with a challenge response that includes a user ID and a Network Access Identifier (NAI), attempting to match the NAI and the user ID in the AACI TLVs for authentication to process the CHAP challenge; and
   in response to the gateway node responding to the CHAP challenge with no NAI present and one or more AACI TLVs with a NULL NAI, attempting to match the user ID to process the CHAP challenge.

6. The method according to claim 1, wherein for a communications session authenticated with Password Authentication Protocol (PAP), the method further comprises:
   an Access Gateway Function (AGF) attempting to match a user ID, Network Access Identifier (NAI), and a password against the AACI TLVs for authentication.

7. The method according to claim 1 further including importing subscriber credentials into the RG-LWAC of the 5G system as the additional subscriber credentials.

8. A node in a 5$^{th}$ generation (5G) system operating as a gateway function to provide multiple sets of legacy credentials to be applied to one subscription in the 5G system, where a subscriber initiates via legacy wireline access to the 5G system, multiple communications sessions each requiring respective different credential, the node comprising:
   at least one processor; and
   a memory comprising instructions which, when executed by the at least one processor, cause the gateway function to:
      receive, at the gateway function of the 5G system, subscriber legacy wireline access via a gateway node of the subscriber;
      register the subscriber with the 5G system and identify subscriber subscription based on line identification (ID);
      in response to registration of the subscriber with the 5G system, receive subscription information from a subscription data structure of the 5G system, wherein the subscription data structure is a Residential Gateway-Level Wireline Access Characteristics (RG-LWAC); and
      initiate the multiple communications sessions between the subscriber and the 5G system by having the gateway function authenticate each of the multiple communications sessions based on the line ID, relate the line ID to additional subscriber credentials stored in the RG-LWAC as one or more Additional Authentication Credential Instance (AACI) Type-Length-Values (TLVs), and apply the additional subscriber credentials for authorization of respective individual communications sessions.

9. The node according to claim 8, wherein the node functions as an Access Gateway Function (AGF) of the 5G system.

10. The node according to claim 8, wherein the multiple communications sessions are authenticated with Password Authentication protocol (PAP), authenticated with Challenge Handshake Authentication protocol (CHAP), or employ a mix of both PAP and CHAP.

11. The node according to claim 8, wherein the gateway node of the subscriber is a Fixed Network-Residential Gateway.

12. The node according to claim 8, wherein for a Challenge Handshake Authentication Protocol (CHAP) authenticated session, the node is to further:
   issue a CHAP challenge to the gateway node of the subscriber;
   in response to the gateway node responding to the CHAP challenge with a challenge response that includes a user ID and a Network Access Identifier (NAI), attempt to match the NAI and the user ID in the AACI TLVs for authentication to process the CHAP challenge; and
   in response to the gateway node responding to the CHAP challenge with no NAI present and one or more AACI TLVs with a NULL NAI, attempt to match the user ID to process the CHAP challenge.

13. The node according to claim 8, wherein for a Password Authentication Protocol (PAP) authenticated session, the node is to further:
   attempt to match a user ID, Network Access Identifier (NAI), and a password against the AACI TLVs for authentication.

14. The node according to claim 8, wherein subscriber credentials are imported into the RG-LWAC of the 5G system as the additional subscriber credentials.

15. A non-transitory computer-readable storage medium comprising instructions which, when executed on at least one processor, cause the at least one processor to carry out operations providing multiple sets of legacy credentials to be applied to one subscription in a $5^{th}$ generation (5G) system, where a subscriber initiates via legacy wireline access to the 5G system, multiple communications sessions each requiring respective different credential, the operations comprising:

receiving, at a gateway function of the 5G system, subscriber legacy wireline access via a gateway node of the subscriber;

registering the subscriber with the 5G system and identifying subscriber subscription based on line identification (ID);

in response to registering the subscriber with the 5G system, receiving subscription information from a subscription data structure of the 5G system, wherein the subscription data structure is a Residential Gateway-Level Wireline Access Characteristics (RG-LWAC); and initiating the multiple communications sessions between the subscriber and the 5G system by having the gateway function authenticate each of the multiple communications sessions based on the line ID, relate the line ID to additional subscriber credentials stored in the RG-LWAC as one or more Additional Authentication Credential Instance (AACI) Type-Length-Values (TLVs), and apply the additional subscriber credentials for authorization of respective individual communications sessions.

16. The non-transitory computer-readable storage medium according to claim 15, wherein the gateway function of the 5G system is an Access Gateway Function (AGF) of the 5G system.

17. The non-transitory computer-readable storage medium according to claim 15, wherein the multiple communications sessions are authenticated with Password Authentication Protocol (PAP), Challenge Handshake Authentication Protocol (CHAP), or employ a mix of both PAP and CHAP.

18. The non-transitory computer-readable storage medium according to claim 15, wherein the gateway node of the subscriber is a Fixed Network-Residential Gateway.

19. The non-transitory computer-readable storage medium according to claim 15, wherein for a communications session authenticated with Challenge Handshake Authentication Protocol (CHAP), the operations further comprises:

an Access Gateway Function (AGF) issuing a CHAP challenge to the gateway node of the subscriber;

in response to the gateway node responding to the CHAP challenge with a challenge response that includes a user ID and a Network Access Identifier (NAI), attempting to match the NAI and the user ID in the AACI TLVs for authentication to process the CHAP challenge; and in response to the gateway node responding to the CHAP challenge with no NAI present and one or more AACI TLVs with a NULL NAI, attempting to match the user ID to process the CHAP challenge.

20. The non-transitory computer-readable storage medium according to claim 15, wherein for a communications session authenticated with Password Authentication Protocol (PAP), the operations further comprises:

an Access Gateway Function (AGF) attempting to match a user ID, Network Access Identifier (NAI), and a password against the AACI TLVs for authentication.

* * * * *